US009497301B2

(12) United States Patent
Huang et al.

(10) Patent No.: US 9,497,301 B2
(45) Date of Patent: Nov. 15, 2016

(54) ALARM CIRCUIT AND ELECTRONIC DEVICE UTILIZING THE SAME

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Tong-Qi Huang, Wuhan (CN); Chun-Sheng Chen, New Taipei (TW)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/692,002

(22) Filed: Apr. 21, 2015

(65) Prior Publication Data

US 2016/0205232 A1 Jul. 14, 2016

(30) Foreign Application Priority Data

Jan. 10, 2015 (CN) .......................... 2015 1 0011049

(51) Int. Cl.
G08B 27/00 (2006.01)
H04M 1/02 (2006.01)
G08B 25/00 (2006.01)

(52) U.S. Cl.
CPC .......... *H04M 1/0254* (2013.01); *G08B 25/001* (2013.01); *G08B 27/00* (2013.01); *H04M 1/02* (2013.01)

(58) Field of Classification Search
CPC ...... G08B 25/001; G08B 27/00; H05K 7/28; H04M 1/0254
USPC ......................................... 455/404.1, 567, 68
See application file for complete search history.

(56) References Cited

U.S. PATENT DOCUMENTS

| 5,892,457 | A | * | 4/1999 | Kim | ...................... | G08B 3/1033 |
| | | | | | | 340/7.55 |
| 6,133,832 | A | * | 10/2000 | Winder | .............. | G08B 13/1427 |
| | | | | | | 340/10.4 |
| 2008/0316030 | A1 | * | 12/2008 | Deng | ................... | G08B 13/149 |
| | | | | | | 340/571 |

* cited by examiner

*Primary Examiner* — John J Lee
(74) *Attorney, Agent, or Firm* — Zhigang Ma

(57) ABSTRACT

An alarm circuit applied in an electronic device includes an audio interface, an audio processor, a speaker, and a control unit. A first terminal of the control unit is coupled to the audio interface, to receive a first control signal or a second control signal. A second terminal of the control unit receives an alarm on/off signal. A third terminal of the control unit is coupled to the audio processor. When the second terminal of the control unit receives the alarm on signal, and the first terminal of control unit receives the first control signal meanwhile, the alarm on signal is transmitted to the alarm processor through the third terminal of the control unit, and the audio processor outputs the alarm signal through the speaker unit, to warn the user the mobile phone is being stolen immediately.

13 Claims, 3 Drawing Sheets

ALARM CIRCUIT AND ELECTRONIC DEVICE UTILIZING THE SAME

FIELD

The subject matter herein generally relates to an alarm circuit and an electronic device utilizing the alarm circuit.

BACKGROUND

People usually use an earphone with a portable electronic device such as a mobile phone or a tablet computer, for private listening.

BRIEF DESCRIPTION OF THE DRAWINGS

Implementations of the present technology will now be described, by way of example only, with reference to the attached figures.

DETAILED DESCRIPTION

Figure 1:
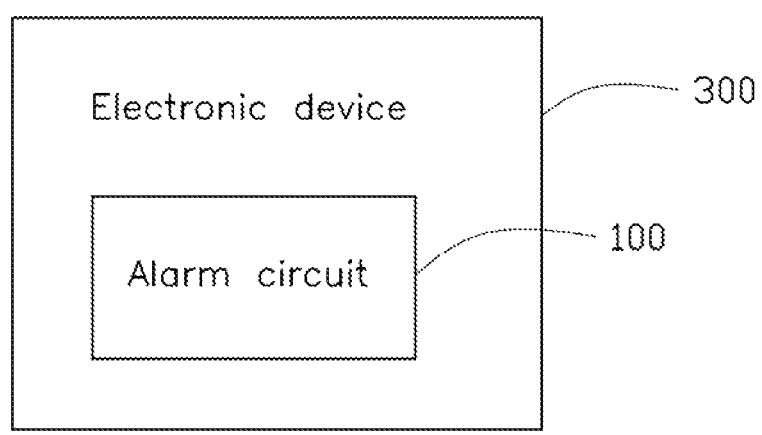
FIG. 1 is a block diagram of an example embodiment of an electronic device including an alarm circuit.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently coupled or releasably coupled. The term "comprising," when utilized, means "including, but not necessarily limited to"; it specifically indicates open-ended inclusion or membership in the so-described combination, group, series and the like.

The disclosure will now be described in relation to an electronic device including an alarm circuit.

FIG. 1 illustrates a block diagram of an example embodiment of an electronic device 300 including an alarm circuit 100. In the embodiment, the electronic device 300 is a mobile phone. Of course, in other embodiments, the electronic device 300 can also be a tablet computer or a notebook computer.

Figure 2:
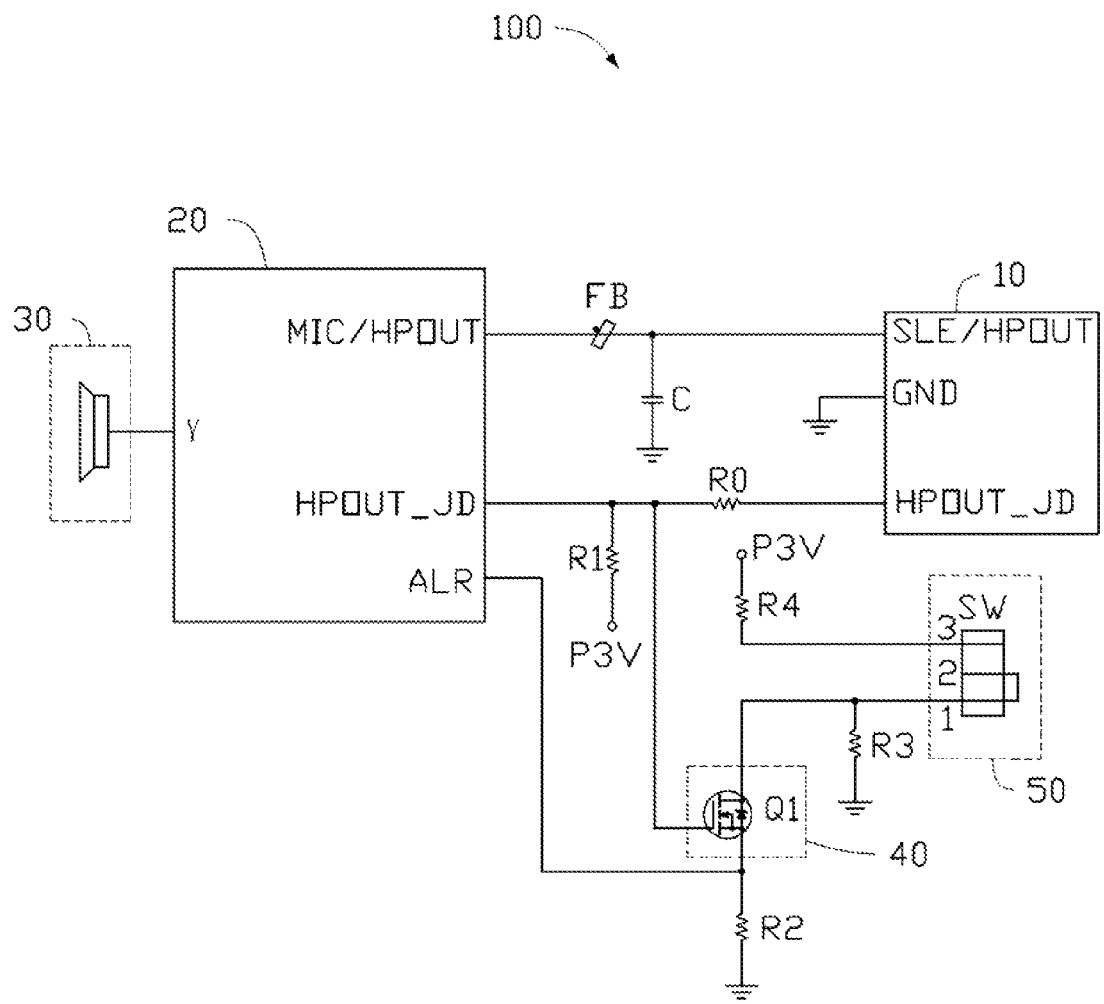
FIG. 2 is a circuit diagram of a first embodiment of the alarm circuit of FIG. 1.

FIG. 2 illustrates a circuit diagram of a first embodiment of the alarm circuit 100. The alarm circuit 100 comprises an audio interface 10, an audio processor 20, a speaker unit 30, a control unit 40, and a switch unit 50. In the embodiment, the audio interface 10 is coupled to a plug, such as an earphone or a dustproof plug. The audio processor 20 is an audio coding and decoding chip. The speaker unit 30 is a loud speaker, and configured to sound alarm, play music, or transmit a ring tone. The control unit 40 includes an electronic switch Q1. In the embodiment, the electronic switch Q1 is an n-channel metal oxide semiconductor field-effect transistor (MOSFET). The switch unit 50 includes a slide switch SW. The slide switch SW includes two stationary contacts 1, 3 and an active contact 2.

A microphone and speaker pin SLE/HPOUT of the audio interface 10 is coupled to a microphone and speaker pin MIC/HPOUT of the audio processor 20. The microphone and speaker pin SLE/HPOUT of the audio interface 10 is grounded through a capacitor C and a fuse wire FB. A ground pin GND of the audio interface 10 is grounded. A speaker control pin HPOUT_JD of the audio interface 10 is coupled to a speaker control pin HPOUT_JD of the audio processor 20 through a resistor R0. The speaker control pin HPOUT_JD of the audio processor 20 is coupled to a power source terminal P3V through a resistor R1. An output terminal Y of the audio processor 20 is coupled to the speaker unit 30.

A gate of the electronic switch Q1 is coupled to the speaker control pin HPOUT_JD of the audio processor 20, and is coupled to the power source terminal P3V through a resistor R1. A source of the electronic switch Q1 is coupled to an alarm pin ALR of the audio processor 20, and is grounded through a resistor R2. A drain of the electronic switch Q1 is coupled to the stationary contact 1 of the slide switch SW, and is grounded through a resistor R3. The stationary contact 3 of the slide switch SW is coupled to the power source terminal P3V through a resistor R4.

In use, a user can turn on/off an alarm function of the mobile phone, through sliding a slide switch SW. When the stationary contact 3 of the slide switch SW is coupled to the active contact 2 of the slide switch SW, the alarm function of the mobile phone is turned on. When the earphone or the dustproof plug is coupled to the audio interface 10, the speaker control pin HPOUT_JD of the audio interface 10 outputs a digital low signal. The electronic switch Q1 is turned off. The alarm pin ALR of the audio processor 20 receives a digital low signal. The output pin Y of the audio processor 20 cannot output an audio decoding signal to the speaker unit 30. The speaker unit 30 does not output an alarm signal. When the earphone or the dustproof plug is disconnected from the audio interface 10, the speaker control pin HPOUT_JD of the audio interface 10 outputs a digital high signal. The electronic switch Q1 is turned on. The alarm pin ALR of the audio processor 20 receives a digital high signal. The output pin Y of the audio processor 20 outputs the audio decoding signal to the speaker unit 30. The speaker unit 30 outputs the alarm signal, according to the audio decoding signal, to warn the user that the mobile phone is being stolen.

When the stationary contact 1 of the slide switch SW is coupled to the active contact 2 of the slide switch SW, the alarm function of the mobile phone is turned off. The alarm circuit cannot operate to output alarm signal.

Figure 3:
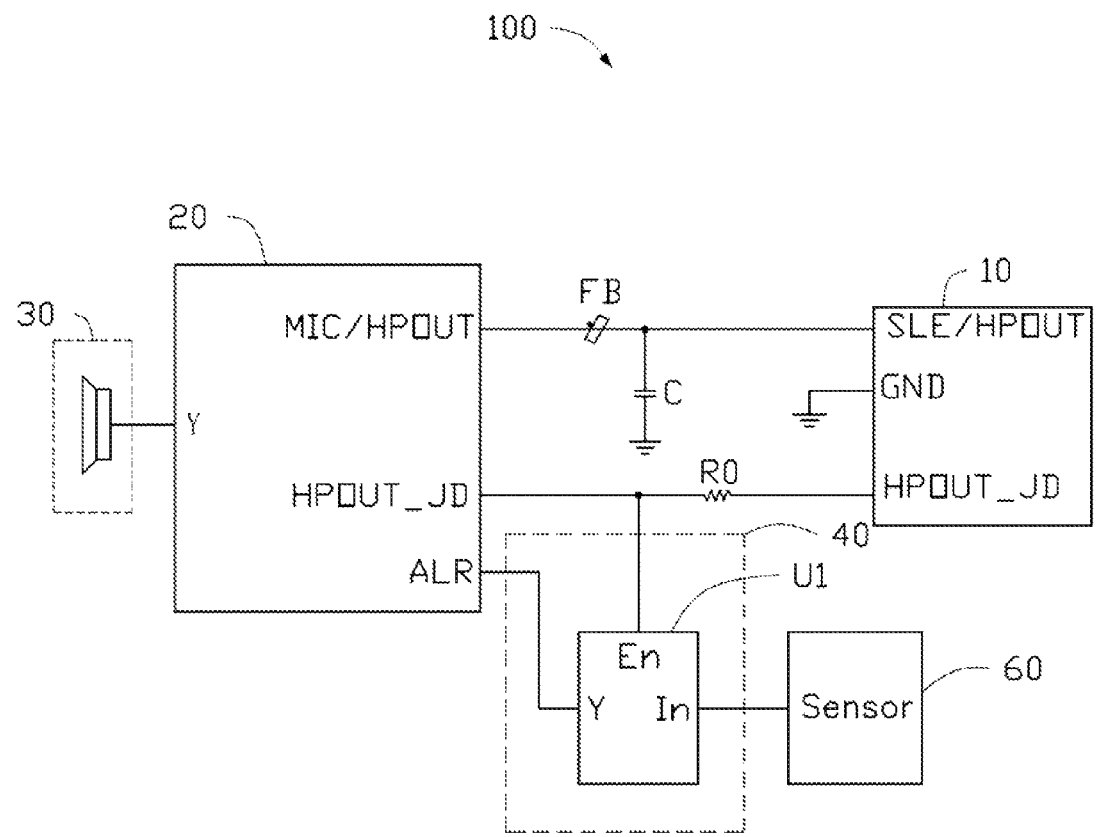
FIG. 3 is a circuit diagram of a second embodiment of the alarm circuit of FIG. 1.

FIG. 3 illustrates a circuit diagram of a second embodiment of the alarm circuit 100. In this embodiment, the control unit 40 is a control chip U1. An input terminal In of the control chip U1 is coupled to a sensor 60. An enable pin En of the control chip U1 is coupled to the speaker control pin HPOUT_JD of the audio processor 20. An output terminal Y of the control chip U1 is coupled to the alarm pin ALR of the audio processor 20. The sensor 60 can output an alarm on/off signal to turn on/off the alarm function, according to a touch on a touch screen of the mobile phone from the user.

When the alarm function is turned on, the sensor 60 outputs the alarm on signal, such as a digital high signal, to the input terminal In of the control chip U1. When the earphone or the dustproof plug is disconnected from the audio interface 10, the speaker control pin HPOUT_JD of the audio interface 10 outputs a digital high signal to the enable pin En of the control chip U1. The output terminal Y of the control chip U1 outputs the alarm on signal to the alarm pin ALR of the audio processor 20. The output pin Y of the audio processor 20 outputs the audio decoding signal to the speaker unit 30. The speaker unit 30 outputs the alarm signal, according to the audio decoding signal, to warn the user that the mobile phone is being stolen.

When the earphone or the dustproof plug is coupled to the audio interface 10, the speaker control pin HPOUT_JD of the audio interface 10 outputs a digital low signal to the enable pin En of the control chip U1. The audio processor 20 cannot output the alarm signal through the speaker unit 30.

When the alarm function is turned off, the audio processor 20 cannot output the alarm signal through the speaker unit 30.

Therefore, When the alarm function is turned on, and the earphone or the dustproof plug is disconnected from the audio interface 10, the speaker unit 30 of the alarm circuit 100 outputs the alarm signal to immediately warn the user that the mobile phone is being stolen.

While the disclosure has been described by way of example and in terms of the embodiment, it is to be understood that the disclosure is not limited thereto. On the contrary, it is intended to cover various modifications and similar arrangements as would be apparent to those skilled in the art. Therefore, the range of the appended claims should be accorded the broadest interpretation so as to encompass all such modifications and similar arrangements.

What is claimed is:

1. An alarm circuit comprising:
    an audio interface configured to be coupled to a plug, wherein the audio interface outputs a control signal;
    an audio processor coupled to the audio interface and configured to start or halt an audio decoding signal based on the control signal;
    a speaker unit coupled to the audio processor and outputting an alarm signal based on the audio decoding signal;
    a switch unit comprising a slide switch which is configured to output an alarm on signal or an alarm off signal; and
    a control unit comprising a first terminal coupled to the audio interface for receiving the control signal, a second terminal receiving the alarm on signal or the alarm off signal, a third terminal coupled to the audio processor.

2. The alarm circuit of claim 1, wherein the control unit further comprises an electronic switch, the first terminal, the second terminal, and the third terminal of the control unit correspond to a control terminal, a first terminal, and a second terminal of the electronic switch; a speaker and control pin of the audio processor is coupled to a speaker and control pin of the audio interface, and is coupled to the control terminal of the electronic switch; the first terminal of the electronic switch receives the alarm on signal or the alarm off signal, an alarm pin of the audio processor is coupled to the second terminal of the electronic switch, the second terminal of the electronic switch is grounded through a first resistor; when the control terminal of the electronic switch receives the control signal, and the first terminal of the electronic switch receives the alarm on signal, the electronic switch is turned on, and the alarm on signal is transmitted to the audio processor through the electronic switch.

3. The alarm circuit of claim 2, further comprising a switch unit, wherein the slide switch comprises a first stationary contact coupled to the first terminal of the electronic switch, and is grounded through a second resistor; a second stationary contact coupled to a power source terminal through a third resistor, when an active contact is coupled to the second stationary contact, the slide switch outputs the alarm on signal; when the active contact is coupled to the first stationary contact, the slide switch outputs the alarm off signal.

4. The alarm circuit of claim 3, wherein the electronic switch is an n-channel metal oxide semiconductor field-effect transistor (MOSFET), the control terminal, the first terminal and the second terminal of the electronic switch correspond to a gate, a drain, and a source of the MOSFET, respectively.

5. The alarm circuit of claim 2, wherein the control unit comprises a control chip, the first terminal, the second terminal, and the third terminal of the control unit correspond to an enable pin, an input pin, and an output pin of the control chip; the control terminal of the control chip receives the first control signal or the second control signal, the input pin of the control chip receives the alarm on signal or the alarm off signal, the output pin of the control chip is coupled to the alarm pin of the audio processor, when the enable pin of the control chip receives the control signal, and the input pin of the control chip receives the alarm on signal, the alarm on signal is transmitted to the audio processor through the output pin of the control chip.

6. The alarm circuit of claim 5, further comprising a sensor, wherein the sensor outputs the alarm on signal or the alarm off signal, according to a touch on a touch screen.

7. The alarm circuit of claim 1, wherein the control signal comprises a first control signal or a second control signal, according to the plug connecting to or disconnecting from the audio interface, when the second terminal of the control unit receives the alarm on signal, and the first terminal of the control unit receives the first control signal, the control unit transmits the alarm on signal to the audio processor through the third terminal, and the audio processor outputs the alarm signal through the speaker unit; and wherein when the second terminal of the control unit receives the alarm on signal, and the first terminal of the control unit receives the second control signal, the control unit stops transmitting the alarm signal to the audio processor through the third terminal, the audio processor halts the alarm signal through the speaker unit; and when the second terminal of the control unit receives the alarm off signal, the audio processor stops outputting the alarm signal through the speaker unit.

8. An electronic device comprising an alarm circuit, the alarm circuit comprising:
    an audio interface configured to be coupled to a plug, wherein the audio interface outputs a control signal;
    an audio processor coupled to the audio interface and configured to start or halt an audio decoding signal based on the control signal;
    a speaker unit coupled to the audio processor and outputting an alarm signal based on the audio decoding signal;

a switch unit comprising a slide switch which is configured to output an alarm on signal or an alarm off signal; and a control unit comprising a first terminal coupled to the audio interface for receiving the control signal, a second terminal receiving the alarm on signal or the alarm off signal, a third terminal coupled to the audio processor.

9. The electronic device of claim 8, wherein the control unit further comprises an electronic switch, the first terminal, the second terminal, and the third terminal of the control unit correspond to a control terminal, a first terminal, and a second terminal of the electronic switch; a speaker and control pin of the audio processor is coupled to a speaker and control pin of the audio interface, and is coupled to the control terminal of the electronic switch; the first terminal of the electronic switch receives the alarm on signal or the alarm off signal, an alarm pin of the audio processor is coupled to the second terminal of the electronic switch, the second terminal of the electronic switch is grounded through a first resistor; when the control terminal of the electronic switch receives the control signal, and the first terminal of the electronic switch receives the alarm on signal, the electronic switch is turned on, and the alarm on signal is transmitted to the audio processor through the electronic switch.

10. The electronic device of claim 9, wherein the slide switch comprises a first stationary contact coupled to the first terminal of the electronic switch, and is grounded through a second resistor; a second stationary contact coupled to a power source terminal through a third resistor, when an active contact is coupled to the second stationary contact, the slide switch outputs the alarm on signal; when the active contact is coupled to the first stationary contact, the slide switch outputs the alarm off signal.

11. The electronic device of claim 10, wherein the control unit comprises a control chip, the first terminal, the second terminal, and the third terminal of the control unit correspond to an enable pin, an input pin, and an output pin of the control chip; the control terminal of the control chip receives the first control signal or the second control signal, the input pin of the control chip receives the alarm on signal or the alarm off signal, the output pin of the control chip is coupled to the alarm pin of the audio processor, when the enable pin of the control chip receives the control signal, and the input pin of the control chip receives the alarm on signal, the alarm on signal is transmitted to the audio processor through the output pin of the control chip.

12. The electronic device of claim 11, further comprising a sensor, wherein the sensor outputs the alarm on signal or the alarm off signal, according to a touch on a touch screen.

13. The electronic device of claim 8, wherein the control signal comprises a first control signal or a second control signal, according to the plug connecting to or disconnecting from the audio interface, when the second terminal of the control unit receives the alarm on signal, and the first terminal of the control unit receives the first control signal, the control unit transmits the alarm on signal to the audio processor through the third terminal, and the audio processor outputs the alarm signal through the speaker unit; and wherein when the second terminal of the control unit receives the alarm on signal, and the first terminal of the control unit receives the second control signal, the control unit stops transmitting the alarm signal to the audio processor through the third terminal, the audio processor halts the alarm signal through the speaker unit; and when the second terminal of the control unit receives the alarm off signal, the audio processor stops outputting the alarm signal through the speaker unit.

* * * * *